Oct. 26, 1937.　　　A. F. PRICE　　　2,096,824
POWER SUPPLY CIRCUIT
Filed Jan. 12, 1937
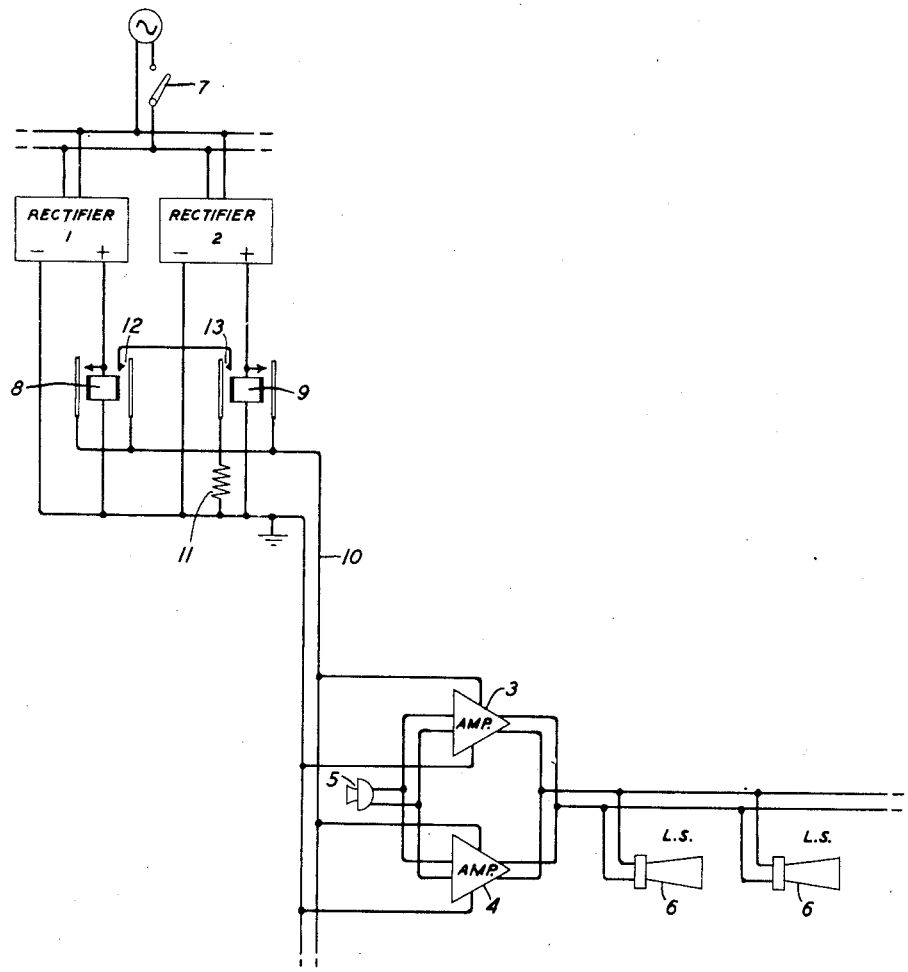
INVENTOR
A. F. PRICE
BY
ATTORNEY Patented Oct. 26, 1937

2,096,824

UNITED STATES PATENT OFFICE 2,096,824

POWER SUPPLY CIRCUIT

Arnold F. Price, Hartsdale, N. Y., assignor to Bell Telephone Laboratories, Incorporated, New York, N. Y., a corporation of New York Application January 12, 1937, Serial No. 120,187

3 Claims. (Cl. 171—97)

This invention relates to circuits for supplying power to electrical apparatus such as amplifiers and the object of the invention is a circuit of this type which affords a high degree of reliability of operation.

The power supply sets commonly used for supplying amplifiers with grid potential and plate current ordinarily include vacuum tube rectifiers having limited output capacity and an output potential which varies appreciably with the load. Such rectifiers must therefore be operated at substantially constant output in order to avoid variations in the power supply which would impair the operating characteristics of the amplifier.

According to this invention two separate power sources for the apparatus are operated in parallel, each source preferably being of sufficient capacity to supply the full output required. Normally both sources are operatively connected to the apparatus to be energized so as to divide the load between them, and the common output circuit is shunted by an impedance which reduces the output voltage to the value which it would have with only one of the sources operating without the shunting impedance. Upon the failure of either supply source this impedance is disconnected from the circuit to keep the voltage constant and the system continues to function from the remaining operative source.

This and other features of the invention will be more clearly understood from the following detailed description and the drawing in which the invention is shown as applied to an amplifying system of the public address type.

For certain applications these systems must be highly reliable and many precautions are taken to avoid the possibility of failure in operation. For example, as shown in the drawing two separate power supply sources such as the rectifiers 1 and 2 may be provided for energizing the amplifying system so that a failure of one rectifier does not disable the system. In some cases two separate amplifying channels 3 and 4 are connected between the transmitter 5 or other signal source and the loud-speakers 6 or other receiving devices and in such a system separate sources of potential for the two amplifier systems is highly desirable.

In the system of this type shown in the drawing, a still further factor of safety is introduced, without requiring additional apparatus or impairing the voltage regulation, by connecting both rectifiers to both amplifier systems so that the failure of either rectifier does not disable either channel. When the rectifiers are energized by closing the switch 7 to connect them to an alternating current supply, the rectified output of the rectifier 1 operates the relay 8 and the output of rectifier 2 operates the relay 9 to connect the output circuits to the common conductor 10 leading to the amplifiers. Upon the operation of these relays a circuit is also completed from the common conductor 10 to ground through a resistor 11 which preferably is of such value that it dissipates the same amount of energy as the amplifiers. Under this condition, assuming that the rectifiers are identical, the potential applied to the amplifiers will be the same as in the case of a single rectifier supplying the system without the shunting resistor.

Upon the failure of either rectifier the corresponding relay will release and disconnect the resistor 11 from the circuit by opening contact 12 or contact 13 as the case may be. The remaining operative rectifier will then continue to energize both amplifier systems without change in the operating characteristics and the defective rectifier may be repaired or replaced at the convenience of the operator.

While the grid, filament and plate potentials for each amplifier all may be derived from a single source, in some cases, particularly for amplifiers of large output capacity, separate rectifiers may be used for grid and plate potentials.

It will be understood, however, that this invention is equally applicable to any of the above types of power supply circuits and while the invention has been described for purposes of illustration with reference to a particular application, it may be modified in various ways and used for various other purposes within the scope of the following claims.

What is claimed is:

1. In a power supply circuit for electrical apparatus, two sources of potential having output circuits normally connected in parallel to the apparatus to be energized, an impedance shunting the output circuits, and means responsive to the failure of either source for automatically disconnecting the shunting impedance.

2. In a power supply circuit for electrical apparatus, two sources of potential having output circuits, a relay in each circuit connecting it to the apparatus to be energized, means for limiting the potential applied to the apparatus to the value applied by one of the sources when the other source is disconnected, and means operated upon the failure of either source for disabling the potential limiting means.

3. In a power supply circuit for amplifiers, two similar sources of direct current energy, an output circuit for each source and a relay therein connecting the circuits in parallel to the amplifier, an impedance, and a circuit including contacts on each relay connecting the impedance to the output circuits.

ARNOLD F. PRICE.